(No Model.)
T. D. LINES.
COUPLING FOR VEHICLE SPRINGS.
No. 277,583. Patented May 15, 1883.
Fig-1-
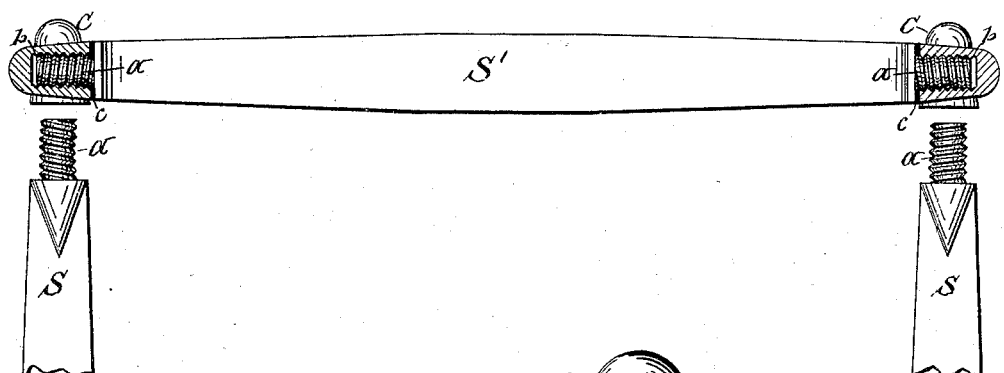
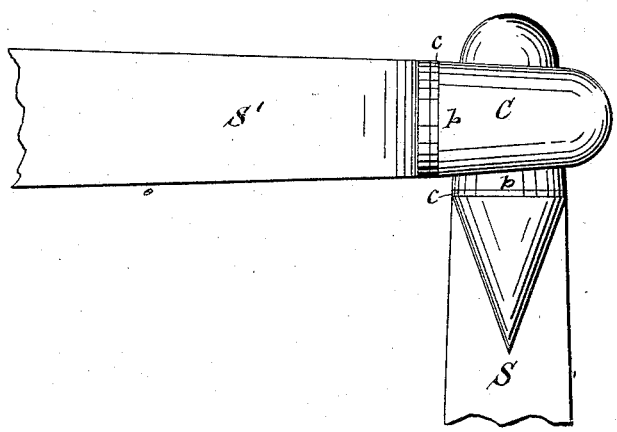
Fig-2-
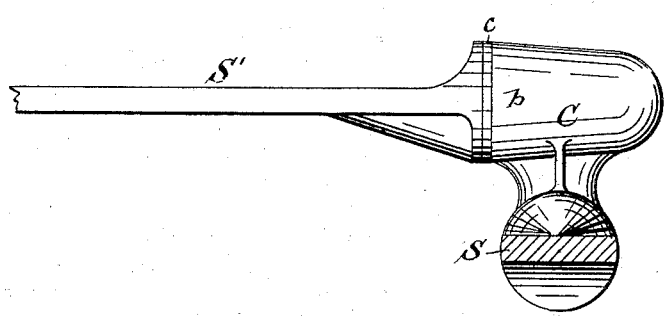
Fig-3-
Witnesses —
Wm. C. Raymond
C. Bendixon
Inventor —
Thomas D. Lines

UNITED STATES PATENT OFFICE.

THOMAS D. LINES, OF SYRACUSE, NEW YORK.

COUPLING FOR VEHICLE-SPRINGS.

SPECIFICATION forming part of Letters Patent No. 277,583, dated May 15, 1883.

Application filed February 26, 1883. (No model.)

*To all whom it may concern:*

Be it known that I, THOMAS D. LINES, of Syracuse, in the county of Onondaga, in the State of New York, have invented new and useful Improvements in Couplings for Vehicle-Springs, of which the following, taken in connection with the accompanying drawings, is a full, clear, and exact description.

This invention consists in an improved device for coupling the ends of cross-springs to the ends of side springs, which coupling is simple in construction, safe and durable in operation, and free from liability of rattling.

The invention is fully illustrated in the annexed drawings, wherein Figure 1 is a horizontal section taken through the upper part of two of the couplings connected to a cross-spring, and showing the ends of the side springs detached from said coupling. Fig. 2 is an enlarged plan view of the coupling with the end of the cross-spring and side spring attached thereto, and Fig. 3 is an elevation of the same.

Similar letters of reference indicate corresponding parts.

S denotes the side springs, and S' the cross-springs, of a vehicle. Both the side springs and cross-springs I provide on their respective ends with a rigid horizontal screw-threaded stud, $a$, by which they are connected to the coupling C, consisting of corresponding screw-threaded thimbles or sockets, $b\ b$, disposed at right angles one over the other and cast in one piece of metal, the connection of the springs with the aforesaid coupling being effected by screwing the studs $a\ a$ into the thimbles or sockets $b\ b$. In order to accomplish this I make the studs $a\ a$ of one pair of the set of springs, preferably the shorter or cross springs, respectively right and left threaded, and the receiving-sockets $b$ of the two couplings with threads running, respectively, in opposite directions, or right and left, corresponding to the studs of the aforesaid springs, the couplings C C being first screwed onto the studs of the longer springs and the shorter springs united therewith by simultaneously entering the studs $a\ a$, at opposite ends thereof, into the sockets $b\ b$ of the couplings, and then turning the spring on its axis in the requisite direction.

In order to effectually guard against the entrance of dust to the described connection of the springs and their couplings, I close the outer end of the thimbles or sockets $b\ b$ and introduce a rubber or leather washer, $c$, between the shoulder of said thimbles and adjacent shoulders on the spring.

It will be observed that by the screw-threaded connection of the ends of the springs with the couplings C C, as hereinbefore described, all liability of the parts becoming loose or detached by jars and twists is obviated, and the lateral play and rattling of the same are most effectually prevented.

Having described my invention, what I claim as new, and desire to secure by Letters Patent, is—

1. The spring S, provided with the screw-threaded stud $a$, in combination with the coupling C, provided with the screw-threaded socket $b$, as shown and set forth.

2. The combination of the couplings C C, provided with sockets $b$, having their threads running, respectively, in opposite directions, and the spring S', provided with right and left threaded studs $a\ a$, respectively at opposite ends, substantially as described and shown.

3. The side spring, S, and cross-spring S', provided each with a screw-threaded stud, $a$, in combination with the coupling C, having screw-threaded sockets $b\ b$ at right angles to and integral with each other.

4. In combination with the springs S S', provided, respectively, with a screw-threaded stud, $a$, the coupling C, consisting of screw-threaded thimbles closed at one end and disposed at right angles one over the other, and cast in one piece, substantially as described and shown.

In testimony whereof I have hereunto signed my name and affixed my seal, in the presence of two attesting witnesses, at Syracuse, in the county of Onondaga, in the State of New York, this 21st day of February, 1883.

THOMAS D. LINES. [L. S.]

Witnesses:
C. H. DUELL,
WM. C. RAYMOND.